Oct. 2, 1923. Re. 15,692

R. E. BROCK

CONTINUOUS TUBE ROLLING MILL

Original Filed Sept. 13, 1920 3 Sheets-Sheet 1

INVENTOR
Richard E. Brock
BY
C. M. Clarke
ATTORNEY

Oct. 2, 1923. Re. 15,692

R. E. BROCK

CONTINUOUS TUBE ROLLING MILL

Original Filed Sept. 13, 1920 3 Sheets-Sheet 2

INVENTOR
Richard E. Brock
BY
J. M. Clarke
ATTORNEY

Oct. 2, 1923. Re. 15,692

R. E. BROCK

CONTINUOUS TUBE ROLLING MILL

Original Filed Sept. 13, 1920 3 Sheets-Sheet 3

INVENTOR
Richard E. Brock
BY
C. M. Clarke
ATTORNEY

Reissued Oct. 2, 1923. Re. 15,692

UNITED STATES PATENT OFFICE.

RICHARD E. BROCK, OF WOOSTER, OHIO, ASSIGNOR, BY MESNE ASSIGNMENTS, TO MACKINTOSH-HEMPHILL COMPANY, OF PITTSBURGH, PENNSYLVANIA.

CONTINUOUS TUBE ROLLING MILL.

Original No. 1,420,239, dated June 20, 1922, Serial No. 409,922, filed September 13, 1920. Application for reissue filed October 4, 1922. Serial No. 592,345.

*To all whom it may concern:*

Be it known that I, RICHARD E. BROCK, a citizen of the United States, residing at Wooster, in the county of Wayne and State of Ohio, have invented certain new and useful Improvements in Continuous Tube Rolling Mills, of which the following is a specification.

This invention relates generally to rolling mills, and primarily to that class known as continuous mills designed more specifically for manufacture of seamless tubing.

As is well known by those familiar with the manufacture of this class of tubing, the blank is passed through a series of alined sets of rolls of progressively decreasing pass diameter, known ordinarily as a "continuous mill."

For reasons not necessary to explain here, inasmuch as they have absolutely no bearing upon my invention, the pass in these rolls is not quite round or cylindrical, being of slightly less diameter in a line transverse to the rolls than longitudinally therewith, in other words, slightly oval or elliptical in the longitudinal plane of the rolls.

It is also necessary that the heavier pressure in each succeeding set of rolls be applied at points in a plane substantially at right angles to the points of heavier pressure of the preceding set of rolls. In other words, the heavier pressure of each succeeding set of rolls should be applied at points substantially 90 degrees away from the points of such heavier pressure of the preceding set of rolls.

Furthermore, the passing of the blank through the rolls will, of course, cause elongation of the former with the result that the forward end of the blank will travel at a constantly increasing rate of speed and, obviously, each succeeding set of rolls must be driven correspondingly faster than the preceding set, the increase in actual practice being substantially four per cent. My invention provides means for accomplishing the desired reduction of the tube, whereby to avoid previously accepted and utilized limitations as to roll and gear diameter and speed, and for more economical and balanced distribution of the power.

With these and other objects in view, which will more clearly appear as the nature of my invention is better understood, the same consists in the novel construction, combination and arrangement of parts as hereinafter more fully described, illustrated and claimed.

A preferred and practical embodiment of my invention is shown in the accompanying drawings, in which.

Similar reference characters designate corresponding parts throughout the several figures of the drawings.

As already suggested, it is necessary or preferable in the rolling of seamless tubes that the heavier pressure of the slightly elliptical roll pass in each succeeding set of rolls be applied at points substantially 90 degrees away from points of such heavier pressure of the preceding set of rolls.

Figure 2:
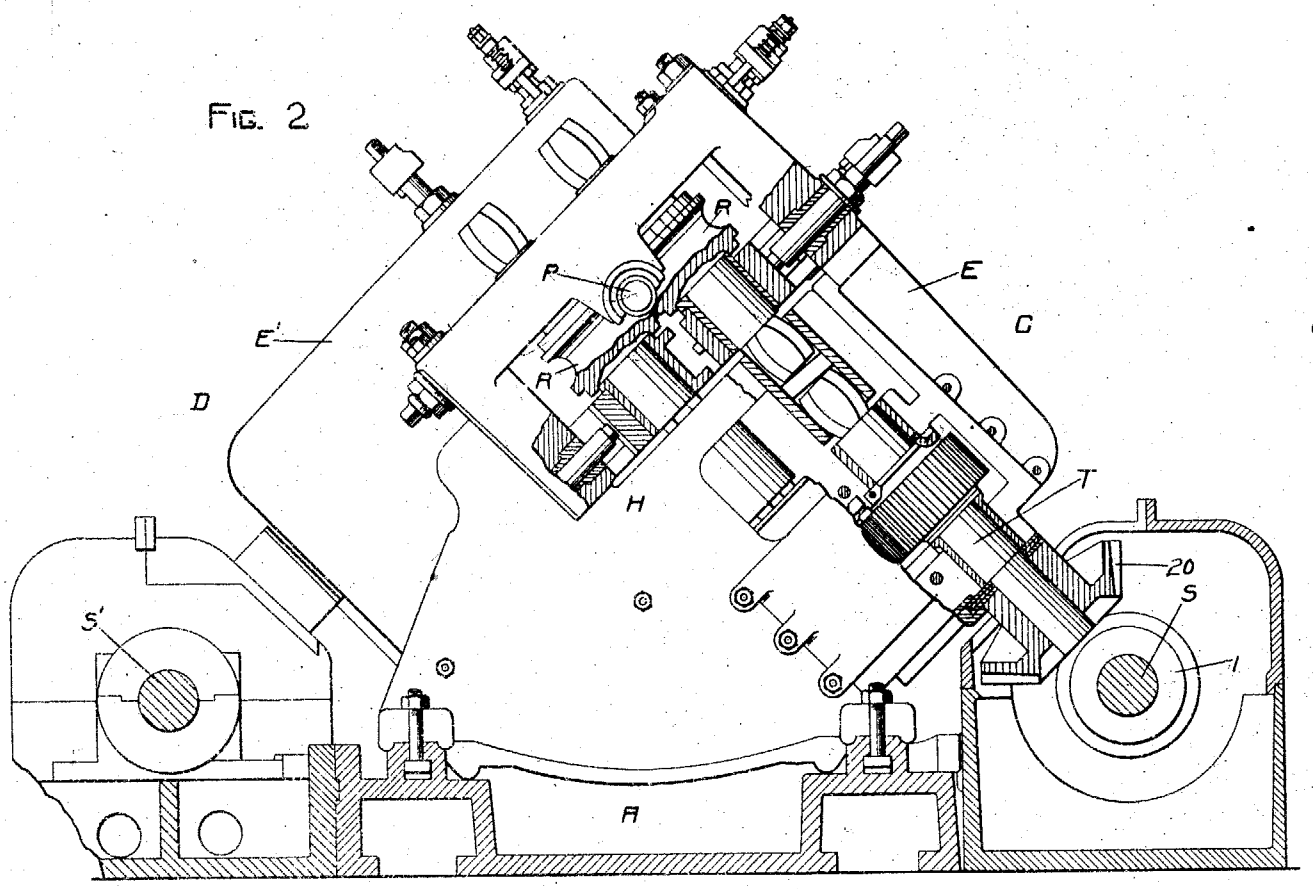
Fig. 2 is an enlarged vertical sectional view illustrating the relative inclination of the individual roll stands or housings of opposite roll trains.

This makes it appropriate to mount or house the alternate sets of rolls at substantially right angles to each other, which I do by placing them at opposing angles of substantially 45 degrees, rather than horizontal and perpendicular. See E and E′, Fig. 2.

Figure 3:
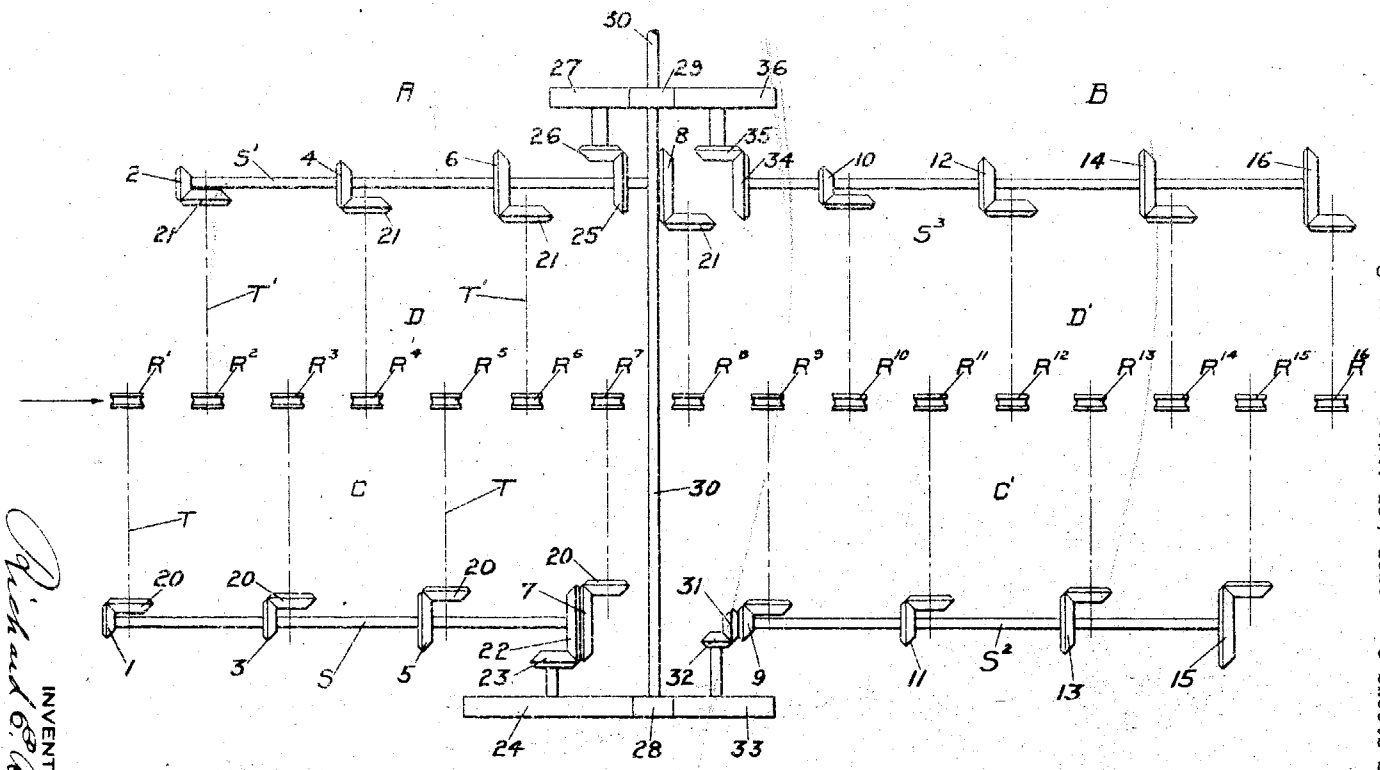
Fig. 3 is a diagram illustrating the invention.

These rolls are grouped in what may be termed mill units, designated upon the drawings as A and B, respectively, each unit including a suitable number, as eight sets, of double rolls comprising two roll trains (C and D in unit A, and C′ and D′ in unit B) of four rolls each, designated respectively $R^1$, $R^3$, $R^5$ and $R^7$ in train C, and $R^2$, $R^4$, $R^6$ and $R^8$ in train D, unit A, and $R^9$, $R^{11}$, $R^{13}$ and $R^{15}$ in train C′, and $R^{10}$, $R^{12}$, $R^{14}$ and $R^{16}$ in train D′ unit B. See Fig. 3.

As the mill units A and B (and more if desired) are identical, a description of one will suffice.

As already indicated, another object of my invention is to provide a simple and economical method of progressively increasing the speed of each succeeding set of rolls to provide and compensate for the constantly increasing rate of speed of the forward end of the blank by reason of the elongation resulting from the desired reduction in size.

Ordinarily, the roll mountings or housings of such a mill are set in alinement, and the necessary progressively increasing rate of speed is accomplished through the medium of a common driving shaft running along one side of the roll train and carrying driving spur gears of progressively increasing diameter, each meshing with the driven spur on its individual roll. This requires the use of a large number of different sized gears (sixteen in a 16 roll train illustrated in the present case), which adds very materially, of course, to the cost of manufacture, and one of the purposes of my invention is to avoid such additional costs.

To accomplish this, I use a separate or independent driving shaft for each train, designated S, $S^1$, $S^2$ and $S^3$ for trains C, D, C′ and D′ respectively. See Fig. 3.

Each of said driving shafts carries a uniform set of driving spur gears of progressively increasing diameter, designated respectively, 1, 3, 5 and 7 on shaft S; 2, 4, 6 and 8 on shaft $S^1$; 9, 11, 13 and 15 on shaft $S^2$; and 10, 12, 14 and 16 on shaft $S^3$. As above stated, these sets of spur driving gears are of uniform diameter, that is to say, spurs 1, 2, 9 and 10 are of the same diameter; 3, 4, 11 and 12 are of the same diameter; 5, 6, 13 and 14 are of the same diameter; and 7, 8, 15 and 16 are of the same diameter.

While not being theoretically correct, it will be sufficiently accurate for all purposes of description and illustration, to say that spur 3 is eight per cent larger than spur 1; spur 5 is eight per cent larger than spur 3; and spur 7 is eight per cent larger than spur 5.

For the purpose of illustration, we will say that shaft S is driven 100 revolutions per minute and shaft $S^1$ 104 revolutions per minute. Spurs 1, 3, 5 and 7 on shaft S will drive pairs of rolls $R^1$, $R^3$, $R^5$ and $R^7$ respectively, while spurs 2, 4, 6 and 8 on shaft $S^1$ will drive pairs of rolls $R^2$, $R^4$, $R^6$ and $R^8$ respectively. It is obvious that with this arrangement, spur 2 on shaft $S^1$, which is of the same diameter as spur 1 on shaft S but travels 4 per cent faster, will drive pairs of rolls $R^2$ four per cent faster than pairs of rolls $R^1$ are driven; spur 3 on shaft S, which is eight per cent larger than spur 2 but travels four per cent slower, will drive pairs of rolls $R^3$ four per cent faster than pairs of rolls $R^2$ are driven; spur 4 on shaft $S^1$, which is the same size as spur 3 but travels four per cent faster, will drive pairs of rolls $R^4$ four per cent faster than pairs of rolls $R^3$ are driven; spur 5 on shaft S, which is eight per cent larger than spur 4 but travels four per cent slower, will drive pairs of rolls $R^5$ four per cent faster than pairs of rolls $R^4$ are driven; spur 6 on shaft $S^1$, which is the same size as spur 5 but travels four per cent faster, will drive pairs of rolls $R^6$ four per cent faster than pairs of rolls $R^5$ are driven; spur 7 on shaft S, which is eight per cent larger than spur 6 but travels four per cent slower, will drive pairs of rolls $R^7$ four per cent faster than pairs of rolls $R^6$ are driven; while spur 8 on shaft $S^1$, which is the same size as spur 7 but travels four per cent faster, will drive pairs of rolls $R^8$ four per cent faster than pairs of rolls $R^7$ are driven.

It will be apparent that, in order to maintain this uniform progressively increasing rate of speed of the pairs of rolls throughout unit B, rolls $R^9$ must be driven thirty-two per cent faster than pairs of rolls $R^1$. Consequently, as spur 9 on shaft $S^2$ is of the same size as spur 1 on shaft S, it will be necessary to drive shaft $S^2$ thirty-two per cent faster than shaft S is driven; while shaft $S^1$ will be driven four per cent faster than shaft $S^2$, for the same reason that shaft $S^1$ is driven four per cent faster than shaft S in unit A.

It is obvious that any number of mill units may be included in a completed mill, the driving shafts of each succeeding unit being driven proportionately faster than those of the preceding unit, in order that they may do their work with the same uniform set of driving spurs.

Figure 1:
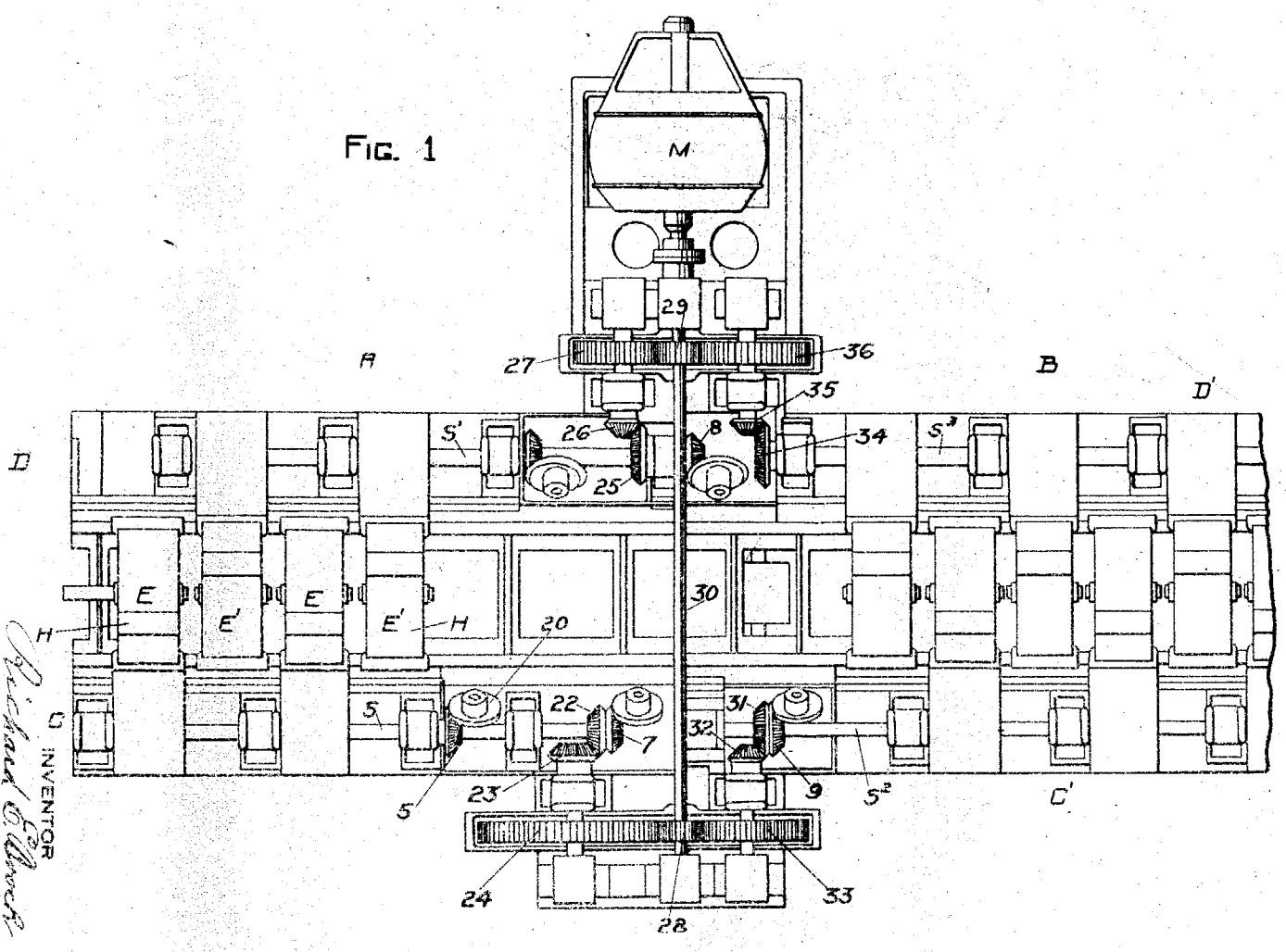
Fig. 1 is a top plan view of a mill including two units constructed in accordance with the present invention.

The motor M, with its common driving shaft 30, carrying gears 28 and 29, furnishes the motive power for the four shafts S, $S^1$, $S^2$ and $S^3$, the first being driven through gears 24, 23 and 22, the second through gears 27, 26 and 25, the third through gears 33, 32 and 31, and the fourth through gears 36, 35 and 34. Pinions 28, 29, intervening between gears 24, 33, and 27, 36, respectively, provide for any practicable distribution of power to the several shafts and trains without excessive variation in gear diameters or speeds. See Figs. 1 and 3.

What I claim is:

1. In a continuous tube rolling mill, a mill unit including a plurality of roll stands carrying pass forming rolls, separate driving shafts respectively at opposite sides of the roll positions, gearing between each shaft and the rolls of alternate roll stands, the said gearing including a gear set for each roll stand, and the corresponding gear sets at opposite sides of the unit including gears of uniform size, and means for driving one of said driving shafts faster than the other.

2. In a continuous tube rolling mill, a mill unit including a plurality of roll stands carrying pass forming rolls, separate driving shafts respectively at opposite sides of the roll positions, a series of uniform gearing sets between each shaft and the rolls of alternate roll stands, the said gearing sets of each shaft having a progressive speed ratio, and means for driving one of said shafts faster than the other.

3. In a continuous tube rolling mill, a plurality of mill units each of which includes a plurality of roll stands carrying pass forming rolls, separate driving shafts respectively at opposite sides of the roll positions, gearing between each shaft and the rolls of alternate roll stands, said gearing having a ratio to progressively increase the speed of successive rolls, and a common source of power having driving connections with the said driving shafts and providing means for operating the two shafts of each mill unit at different speeds, and also driving the two shafts of one mill unit faster than the shafts of the immediately preceding unit.

4. In a continuous tube rolling mill, a series of mill units having the rolls of individual roll stands arranged in alinement to provide a continuous roll pass, opposite gear trains in each unit including opposite shafts, sets of driving gears of uniformly increasing diameter on each shaft and operatively connected with the rolls of alternate roll sets, a source of power common to the several mill units, and connections between the source of power and the shafts of each unit for rotating the shaft located alternately at opposite sides of the mill at uniformly increasing rates of speed.

5. In a continuous tube rolling mill, a plurality of mill units having the rolls of the individual roll stands arranged in alinement to produce a continuous pass, and the said units including opposite shafts, corresponding sets of gears of uniformly increasing diameter carried by said shafts, and driving connections between the gears of the opposite shafts and the rolls of alternate roll stands, means for rotating the opposite shafts at alternate sides of the mill at a uniformly advanced rate of speed, and a common source of power for actuating said means.

6. In a continuous tube rolling mill, a mill unit including a plurality of roll stands, rolls in each stand forming a roll pass, separate shafts at each side of the pass formed by the rolls of the roll stands, gears of progressively and uniformly increasing diameter arranged on said shafts and located opposite alternate roll stands, driving connections between said rolls and said gears, means for driving one of said shafts at a faster rate of speed than the other, and a common source of power for actuating said means.

7. In a continuous tube rolling mill, a mill unit including a plurality of alternately arranged roll stands carrying pass forming rolls, separate driving shafts at opposite sides of the roll positions, pairs of gears between said shafts and each roll stand, and a power shaft having a differently proportioned pinion and gear connection with each of said driving shafts.

8. In a continuous tube rolling mill, a plurality of alternately arranged pairs of rolls having corresponding oppositely extending roll shafts, pairs of main outermost driving shafts therefor and means for driving them together, and pairs of differently proportioned gears between the outermost shafts and the several roll shafts for transmitting power to the rolls at successively increasing speeds.

9. In a continuous tube rolling mill, a plurality of alternately arranged pairs of rolls having corresponding oppositely extending roll shafts, pairs of main outermost driving shafts therefor and means for driving each shaft of each pair at different speeds, and pairs of differently proportioned gears between the outermost shafts and the several roll shafts for transmitting power to the rolls at successively increasing speeds.

10. In a continuous tube rolling mill, a plurality of alternately arranged pairs of rolls having corresponding oppositely extending roll shafts, a plurality of pairs of main outermost driving shafts longitudinally arranged at each side of the rolls, means connecting said shafts at each side with each other, and with a prime mover, and gearing connecting said shafts with the roll shafts.

11. In a continuous tube rolling mill, a plurality of alternately arranged pairs of rolls having corresponding oppositely extending roll shafts, a plurality of pairs of main outermost driving shafts longitudinally arranged at each side of the rolls, means connecting said shafts at each side with each other, and with a prime mover, and differently proportioned gearing connecting said shafts with the roll shafts.

12. In a continuous tube rolling mill, a plurality of alternately arranged pairs of rolls having corresponding oppositely extending roll shafts, pairs of main outermost driving shafts therefor in axial alinement and means for driving them at different speeds from a common prime mover, and successively graduated differently proportioned pairs of gears between the outermost shafts and the roll shafts for transmitting power to the rolls at successively increasing speeds.

13. In a continuous tube rolling mill, a plurality of pairs of rolls in pass alinement having alternating oppositely arranged downwardly sloping roll shafts, main outermost driving shafts therefor in axial alinement geared with a common prime mover, and pairs of differently proportioned gears connecting the driving shafts with the roll shafts whereby to drive the pairs of rolls at successively increasing speeds.

14. In a continuous tube rolling mill, a plurality of pairs of rolls in pass alinement having alternating roll shafts disposed in substantially equal angular arrangement at each side whereby to provide a successive series of opposing roll treatments to the blank, pairs of main outermost driving shafts therefor in axial alinement, gearing for driving the outermost shafts at differently proportioned speeds from a prime mover, and pairs of gears connecting the outermost shafts with roll shafts.

15. In a continuous tube rolling mill, a plurality of pairs of rolls in pass alinement having alternating roll shafts disposed in substantially equal angular arrangement at each side whereby to provide a successive series of opposing roll treatments to the blank, pairs of main outermost driving shafts therefor in axial alinement, gearing for driving the outermost shafts from a prime mover, and pairs of differently proportioned gears connecting the outermost shafts with the roll shafts whereby to drive the several pairs of rolls at successively increasing speeds.

In testimony whereof I affix my signature.

RICHARD E. BROCK.